(12) United States Patent
Roelands et al.

(10) Patent No.: US 9,397,962 B2
(45) Date of Patent: Jul. 19, 2016

(54) TERMINAL AND METHOD FOR EXCHANGING MESSAGES BY MEANS OF TOKENS BROUGHT IN PROXIMITY TO SAID TERMINAL, COMMUNICATION SYSTEM, AND TOKEN

(75) Inventors: Marc Roelands, Lier (BE); Marjan Geerts, Wilrijk (BE); Mohamed Ali Feki, Brussels (BE); Koen De Voegt, Hoboken (BE); Johan Criel, Ghent (BE); Laurence Claeys, Ghent (BE); Marc Godon, Londerzeel (BE); Pascal Zontrop, Baal (BE); Lieven Trappeniers, Herentals (BE)

(73) Assignee: Alcatel Lucent, Boulogne-Billancourt (FR)

( * ) Notice: Subject to any disclaimer, the term of this patent is extended or adjusted under 35 U.S.C. 154(b) by 827 days.

(21) Appl. No.: 13/698,915

(22) PCT Filed: May 10, 2011

(86) PCT No.: PCT/EP2011/057557
§ 371 (c)(1),
(2), (4) Date: Jan. 31, 2013

(87) PCT Pub. No.: WO2011/145503
PCT Pub. Date: Nov. 24, 2011

(65) Prior Publication Data
US 2013/0124654 A1    May 16, 2013

(30) Foreign Application Priority Data
May 20, 2010    (EP) .................................... 10305534

(51) Int. Cl.
*H04L 12/58*    (2006.01)
*G06Q 10/10*    (2012.01)
*H04L 29/08*    (2006.01)

(52) U.S. Cl.
CPC .............. *H04L 51/00* (2013.01); *G06Q 10/107* (2013.01); *H04L 12/5865* (2013.01);
(Continued)

(58) Field of Classification Search
CPC ..... H04L 12/5865; H04L 51/00; H04L 51/20; H04L 67/12; H04L 12/5895; H04L 2209/805; H04L 2209/80; G06Q 10/107; H04Q 2209/47
USPC ........................... 709/204–206; 715/751–759
See application file for complete search history.

(56) References Cited

U.S. PATENT DOCUMENTS 8,333,317 B2 * 12/2012 Buer et al. .................... 235/380
8,806,616 B2 * 8/2014 Buer et al. ...................... 726/20
(Continued)

FOREIGN PATENT DOCUMENTS

DE    196 43 736 A1    10/1997
EP    1 369 810 A2    12/2003
(Continued)

OTHER PUBLICATIONS

Masanori Sugimoto et al., "Caretta: A System for Supporting Face-to-Face Collaboration by Integrating Personal and Shared Spaces," Proceedings of the SIGCHI Conference on Human Factors in Computing Systems, vol. 6, No. 1, pp. 41-48, XP040178766, Vienna, Austria, Apr. 24-29, 2004.
(Continued)

*Primary Examiner* — Kenneth R Coulter
(74) *Attorney, Agent, or Firm* — Fay Sharpe, LLP

(57) ABSTRACT

The invention pertains to a terminal for exchanging messages by placing tokens near it. The terminal comprises communication means to exchange information with a database, detection means for identifying local tokens placed near the terminal, display means for displaying remote tokens, and proximity logic configured to assert a proximity relationship between tokens or between a token and a reference point. The terminal exchanges information about the topology of its tokens and that of tokens present at other terminals via the database. The terminal displays tokens present near remote copies of the local tokens, based on information obtained from the database.

15 Claims, 7 Drawing Sheets

(52) U.S. Cl.
CPC ............... *H04L 51/20* (2013.01); *H04L 67/12* (2013.01); *H04L 12/5895* (2013.01); *H04L 2209/80* (2013.01); *H04L 2209/805* (2013.01); *H04Q 2209/47* (2013.01)

(56) References Cited

U.S. PATENT DOCUMENTS

| | | | |
|---|---|---|---|
| 9,264,231 B2* | 2/2016 | Dean | G06F 21/35 |
| 2005/0105734 A1* | 5/2005 | Buer et al. | 380/270 |
| 2006/0246403 A1 | 11/2006 | Monpouet et al. | |
| 2009/0210940 A1* | 8/2009 | Dean | 726/19 |
| 2009/0271727 A1* | 10/2009 | Levy | G06F 3/03 |
| | | | 715/771 |
| 2010/0001848 A1* | 1/2010 | McAllister et al. | 340/10.51 |
| 2010/0293263 A1* | 11/2010 | Caire et al. | 709/223 |
| 2011/0193958 A1* | 8/2011 | Martin | H04N 7/181 |
| | | | 348/143 |
| 2013/0010962 A1* | 1/2013 | Buer et al. | 380/270 |
| 2015/0058620 A1* | 2/2015 | Buer et al. | 713/156 |

FOREIGN PATENT DOCUMENTS

| | | | |
|---|---|---|---|
| WO | WO 2005/078562 A1 | | 8/2005 |
| WO | WO 2009083019 A1 * | | 7/2009 |

OTHER PUBLICATIONS

Robert J. K. Jacob et al., "A Tangible Interface for Organizing Information Using a Grid," Proceedings of CHI 2002, Conference on Human Factors in Computing Systems, pp. 1-9, XP007900657, Apr. 20, 2001.
International Search Report for PCT/EP2011/057557 dated Jan. 19, 2012.

* cited by examiner

TERMINAL AND METHOD FOR EXCHANGING MESSAGES BY MEANS OF TOKENS BROUGHT IN PROXIMITY TO SAID TERMINAL, COMMUNICATION SYSTEM, AND TOKEN

FIELD OF INVENTION

The present invention relates to communication terminals, in particular terminals for use in multipoint-to-multipoint communication systems.

BACKGROUND

Several systems exist to establish instant or non-instant visual messaging between two or more users connected to a communication network, wherein the messages comprise text, emoticons, and graphics. These systems require the use of a relatively complex terminal, such as personal computer, a PDA or a mobile telephone. A digital messaging platform that can efficiently be used by users who are not computer-savvy is wanting.

Man-machine interfaces that operate on the basis of detecting proximity of a certain physical object (token) near a detector are known in the art. To date, no system is known in which a physical proximity interface is efficiently used to establish digital messaging.

SUMMARY

According to an aspect of the present invention, there is provided a terminal for exchanging messages by means of tokens brought in proximity to the terminal, the terminal comprising communication means to exchange token relationship information with a storage means; detection means for substantially localizing and identifying local semantic tokens brought in proximity to the terminal; display means for displaying a visual representation of remote semantic tokens; proximity logic configured to assert a local proximity relationship between a first one of the local semantic tokens and a reference location if the first one of the local semantic tokens and the reference location are localized at a distance below a predetermined first proximity radius, said reference location being a second one of the local semantic tokens or a fixed point on the terminal; a database update agent, operatively coupled to the proximity logic, for storing asserted local proximity relationships in the storage means; and a database querying agent for obtaining cross-site proximity relationship information pertaining to the local semantic tokens from the storage means, said cross-site proximity relationship information comprising an identification of remote semantic tokens present at another terminal in a proximity relationship with semantic tokens equivalent to respective ones of said local semantic tokens; wherein the display means is configured to display visual representations of the remote semantic tokens in proximity to respective ones of the local semantic tokens in accordance with the cross-site proximity relationship information.

Embodiments of the invention facilitate electronic messaging with an extremely simple user interface. By simply placing tokens that represent particular semantic entities in proximity of the terminal, and by given several such tokens a chosen spatial relationship, proximity networks are formed that intuitively correspond to simple statements related to the semantic entities. As the terminal also displays selected statements generated at other terminals, and vice versa, two-way or more-way communication about these statements is established.

In an embodiment, the terminal of the present invention further comprises a terminal identification zone, wherein the detection means is configured to identify an identification token brought in proximity to the identification zone, and wherein the proximity logic is further configured to assert a local proximity relationship between the identification token and each of the local semantic tokens.

It is an advantage of this embodiment that the user may place a single token at or near a designated location of the terminal, to individualize the terminal. This individualization is achieved by the fact that every other token added to the terminal will be considered to be linked to the identification token. Hence, the chosen identification token will be a member of all cross-site proximity relationships emanating from the individualized terminal, and will be seen as such by other participants in the communication session.

In an embodiment, the terminal of the present invention further comprises a substantially board-shaped housing, wherein the display means extends substantially over one side of the board-shaped housing.

In an embodiment, the terminal of the present invention is further adapted to releasably hold the local semantic tokens in place. In a specific embodiment, the terminal is adapted to hold semantic tokens by magnetic force.

It is an advantage of these embodiments that the user interface is extremely simple. This embodiment facilitates electronic messaging with an interaction that is no more complex than for example attaching notes to a billboard, or magnets to a refrigerator door. As a result, electronic messaging, even instant messaging, is made accessible to users who are not computer-oriented.

According to another aspect of the present invention, there is provided a communication system comprising a plurality of terminals of the kind described above; a plurality of tokens at each one of the plurality of terminals; and storage means for storing the proximity relationships between the tokens.

In an embodiment of the communication system of the present invention, each token of the plurality of tokens comprises a visual marking and electronic identification means.

It is an advantage of this embodiment that the tokens are easily identifiable by the user, by means of the visual marking which is advantageously related to the semantic significance of the token, and by the terminal, by means of the electronic identification means. Hence, the terminal need not be capable of optically recognizing the visual marking intended for the user in order to recognize the token.

In an embodiment of the communication system of the present invention, the plurality of tokens comprises a plurality of classes of tokens with a substantially identical visual marking. In a particular embodiment, the proximity logic of the terminals is further configured to assert a local class proximity relationship between a first one of the classes and a reference location if a first one of the local semantic tokens belonging to the first one of the classes and the reference location are localized at a distance below a predetermined first proximity radius, the reference location being a second one of the local semantic tokens belonging to a second one of the classes or a fixed point on the terminal.

It is an advantage of this embodiment that different individual tokens can be used to represent different instances of the same class, i.e., tokens with the same semantic significance. Accordingly, a user may use two different tokens visually marked with the same sign to communicate two different facts related to the entity represented by the sign. Accordingly, different users may use different tokens visually marked with the same sign to communicate together about the entity represented by the sign.

In a particular embodiment of the communication system of the present invention, the electronic identification means comprises an RFID tag.

It is an advantage of this embodiment that the identity and location of the tokens can be determined accurately with a set of relatively low-cost detectors in the terminal.

In an embodiment of the communication system of the present invention, the token further comprises terminal attachment means for attaching the token to one of the plurality of terminals. In a particular embodiment, the terminal attachment means comprises a magnetic element.

It is an advantage of this embodiment that the terminal may be used in a substantially vertical mode, while maintaining the spatial relationships between the tokens.

According to another aspect of the present invention, there is provided a token for use in the communication system described above.

According to another aspect of the present invention, there is provided a method for exchanging messages by means of tokens brought in proximity to a terminal, the method comprising substantially localizing and identifying local semantic tokens brought in proximity to the terminal; asserting a local proximity relationship between a first one of the local semantic tokens and a reference location if the first one of the local semantic tokens and the reference location are localized at a distance below a predetermined first proximity radius, the reference location being a second one of the local semantic tokens or a fixed point on the terminal; storing asserted local proximity relationships in a storage means; obtaining cross-site proximity relationship information pertaining to the local semantic tokens from the storage means, the cross-site proximity relationship information comprising an identification of remote semantic tokens present at another terminal in a proximity relationship with semantic tokens equivalent to respective ones of the local semantic tokens; displaying visual representations of the remote semantic tokens in proximity to respective ones of the local semantic tokens in accordance with the cross-site proximity relationship information.

In an embodiment of the method of the present invention, the terminal is a designated area on a computer display, and wherein the semantic tokens are icons on the computer display, the tokens being brought in proximity to the terminal by dragging and dropping the icons into the designated area.

It is an advantage of this embodiment that the method can be entirely implemented in a computer, providing the advantageous intuitive interface of the invention on a readily available low-cost platform. It is a further advantage of this embodiment that there is no limit to the number or variety of tokens of which any particular user can dispose.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

Figure 1:
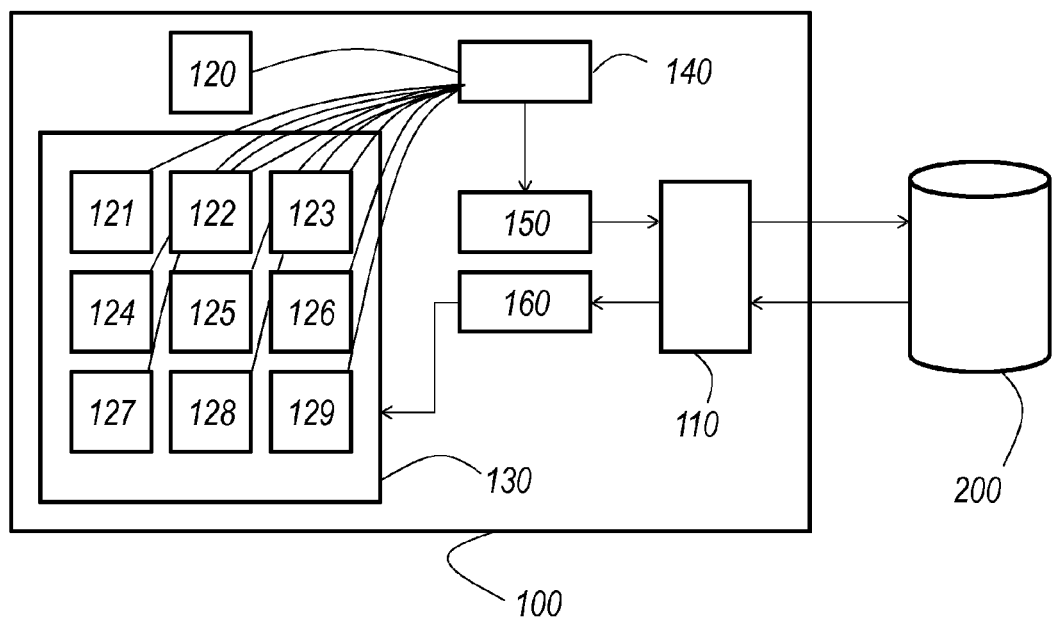
FIG. 1 schematically illustrates a terminal according to an embodiment of the present invention.

The invention is based inter alia on the insight that it is advantageous to offer people a combined physical-virtual view on a distributed set of real-world objects or tokens, in which representations of the physical objects are shown at other places in real-time, as subjects (memos, alerts, queries, . . . ) in ongoing conversations and collaborations, according to a process of adding or removing objects or tokens to a local designated space, making expressions among places or people according to a specific set of representational conventions, e.g. concerning when and where to show remote objects and the meaning of objects either physically touching or not.

Without loss of generality, we will use the term "touching" to describe a proximity relationship, regardless of whether the concerned objects are actually in contact. As will be described in more detail below, two objects may also be deemed to be touching, when each of these objects touches a common third object.

The physical objects used in the various forms of the present invention will be referred to as 'tokens' or 'semantic tokens'.

Different implementations may be considered for designating the active space of a terminal according to the present invention. In an exemplary embodiment, the terminal comprises an enclosure such as a basket, a bag, or a cupboard, in which tokens can be put, and from which tokens can be removed. In another exemplary embodiment, the terminal comprises a board, on which tokens can be placed, and from which tokens can be removed. The board may be adapted for use in a substantially horizontal position, and/or it may be adapted for use in a substantially vertical position, such as a bulletin board or an active white board (i.e., a whiteboard with a built-in display and/or sensors). The tokens may be substantially card shaped, beam shaped, spherical, or any other convenient form. The tokens are preferably of a fixed size. In any case, a terminal according to the present invention should be able to discern whether a token is inside the active physical space or not, i.e. in proximity to the terminal, and whether two or more tokens touching, i.e. in proximity to each other. To this end, the designated space may have specific dimensions, and it may be divided in a number of discrete token positions.

Visual representations of the tokens as shown to remote users can for example be implemented using projection or display systems, which may be two-dimensional or three-dimensional.

A visual representation of touching remote and local tokens that are in a cross-site proximity relationship can be achieved by displaying or projecting the visual representation of the remote token sufficiently close to the physical location of the local token to substantially generate an illusion of touching. It is then of course necessary to localize the local token with sufficient accuracy. This may be achieved by dividing the active space of the terminal into a discrete set of token positions, each of which is dimensioned so as to be able to receive exactly one token, and each of which is adapted to detect the presence of a token.

The terminals of the present invention are adapted to interact with other terminals in a network. To this end, they are equipped with communication means to exchange token relationship information with a storage means.

The storage means may be a database of a known kind accessible via the network. Alternatively, the storage means may consist of different memory elements distributed among the terminals. Communication between the terminals occurs by exchanging information with the storage means.

The terminal is further provided with proximity logic to convert raw token related observations into proximity relationship information which can lead to appropriate displaying or projecting of remote tokens. The terminal thus provides a simple and intuitive user interface in a distributed, physical-virtual space, which allows complex, remote multi-user interactions while requiring only a minimum of semantic conventions.

In an exemplary embodiment, the terminal of the invention comprises an active whiteboard on which the position and identity of card shaped tokens can be detected, wherein the touching of local tokens can be detected by comparing their respective positions, and representations can be displayed in the correct position so as to provide the illusion of two remote tokens touching, or a local token and a remote token touching. In a particular embodiment, the boards are equipped with a raster of RFID readers, or similar NFC card detection technology, so that identities and positions of tagged cards are detected when being placed on the board.

Exemplary tokens are pre-produced cards having a unique card-ID per card, pre-registered in the database as being uniquely associated with a particular concept. Before use, one or more particular tokens are associated with a particular concept. Such concepts may for example include a name of a person or group of people, a name of a place, a specific time or day, an activity, mood or opinion representations, or any other text, mnemonics, emoticons or picture representing a concept (e.g. "Lunch", "16 o'clock", "Kitchen", "Card game", "All team members", "Robin", "Today"). A card ID, read when a card is put on the board, can thus be linked to a particular graphical representation of that card or class of cards (as text of graphical picture format), which in the preparation phase is also printed on the physical cards with that ID. The link between the card ID and its graphical representation is preferably stored in a database record. Cards with substantially the same graphical representation may be considered, from a semantic point of view, to be equivalent.

Users may be allowed to introduce custom cards via a basic provisioning and printing tool, as is known for RFID labels.

Terminals according to the invention may be produced generic, but can become part of the active system by individualizing them. This can be done either by connecting them in a physically permanent way with a card-ID at production time, making them conceptually equivalent to a token, or dynamically, by placing a card on a designated location on the terminal for naming, in that way associating the card's ID with the board. As a result boards are part of the card-ID space, having an association with a concept as provisioned, like the cards. Accordingly, boards may have a person's name (a personal board), or may be named after a group or place (a common board shared among a group of people, or in a particular place or room), or any other concept that the user may consider appropriate.

FIG. 1 provides a schematic illustration of an exemplary embodiment of the terminal of the present invention. The terminal 100 defines a designated active space, which consists of discrete token positions equipped with detection means 120-129 for substantially localizing and identifying tokens brought in proximity to the terminal. Detection means 120-129 are connected to proximity logic 140. Detection means 120 represents the designated terminal naming position, and is located at a slight separation from the remaining detection means 121-129.

Terminal 100 has a display 130, the surface of which substantially coincides with the area covered by the detection means 121-129. Terminal 100 is further equipped with communication means 110, which is schematically shown to be connected with storage means 200.

The display 130 is operatively controlled by database querying agent 160, which extracts the relevant proximity relationship information from storage means 200 via communication means 110.

Proximity logic 140 is operatively connected to detection means 120-129, and also to a database update agent 150. The database update agent 150 sends updated proximity relationship information to the storage means 200 via communication means 110.

The storage means 200 may store physical locations of the tokens in proximity to terminal 100 according to any suitable coordinate system, such that the proximity relationships between pairs of tokens can be mathematically deduced from these locations. Alternatively, storage means 200 may simply store the proximity relationships itself, i.e. the identification of pairs of tokens that are touching, without resorting to a coordinate system. Any other suitable way of storing the topological information required to be able to accurately describe proximity relationships in response to a query may be used. The proximity relationship information may be provided by the database update agent 150 in accordance with the way in which the information is stored in the storage means 200.

The present invention may advantageously be used for a variety of applications in closed or public communities, including shared memo boards, inviting someone to an activity and to negotiate time and place, planning a gathering in a place, collaborating on components/elements to take into account for a task or design, and many more. In an exemplary deployment, the terminals are placed in possibly spread locations (e.g., homes, rooms in one or more residences or office buildings) and interconnected by means of a standard communication network which functionally allows for exchanging data with a central database, or a distributed functional equivalent of that.

Figure 2:
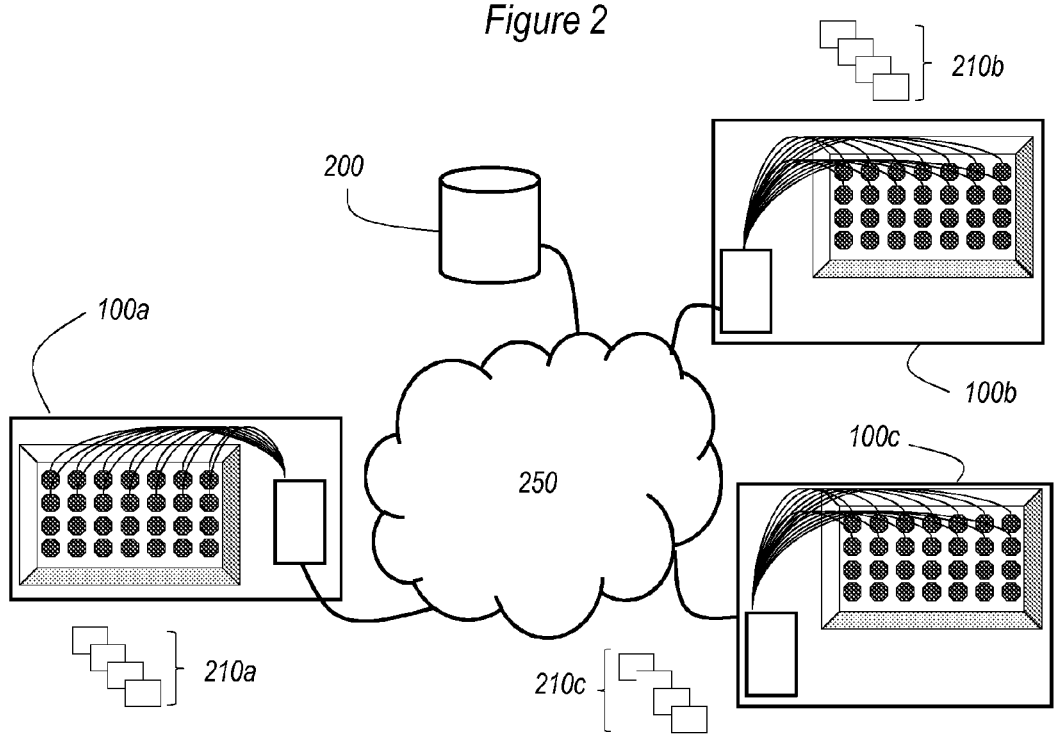
FIG. 2 schematically illustrates a communication system according to an embodiment of the present invention.

FIG. 2 represent an exemplary deployment of the communication system according to the present invention. Without loss of generality, three terminals 100a, 100b, 100c are shown. Each of the terminals is connected to storage means 200 via a network 250. Any suitable type of network infrastructure may be used for this purpose. In particular, the terminals 100a, 100b, 100c may communicate with the storage means 200, and in that way with each other, via the Internet, the PSTN, or a suitable mobile/wireless network. It should be noted that even a very low data throughput can suffice to support the communication requirements of the present invention, as only a few bytes of information have to be transmitted for every addition or removal of a token. Each of the terminals 100a, 100b, 100c is illustrated with an associated set of tokens 210a, 210b, 210c.

Users operate the system by bringing tokens in proximity to the terminal. In doing so, a proximity relationship is created which may be detected by the proximity logic and stored in the storage means. Referring to the example described above, users thus operate the system by placing cards on the board at a position of their choice. By doing this, the distributed virtual space is augmented with a relationship which we will define as a "fact", i.e., a statement made from the terminal, consisting of:
- the newly added token's token-ID;
- the terminal's token-ID, if any, or another token's token-ID;
- the position of the newly added token in relation to the terminal's coordinate system or the other token's position.

A "composite fact" is created by placing physical tokens together at the same terminal in touching (i.e., adjacent) positions.

In an advantageous embodiment, "touching" is a transitive relation for tokens, i.e. when token A touches token B, and token B touches token C, token A is deemed to also touch token C. A composite fact is equivalent to a collection of concepts grouped at one terminal, based on the associated concepts that the respective tokens in the contained facts have. In a particular embodiment, this transitive effect is excluded for the virtual touching relationship between the designated naming token and the other tokens at the terminal.

By bringing a token in proximity to the terminal, a query to the storage means is triggered for composite facts that contain the token's concept. All concepts that result from the query (at least, those not yet part of the composite fact that at the local terminal at which the token is physically present) are displayed or projected on the terminal as virtual remote tokens touching the physical token just added.

In this way, users placing cards on different terminals belonging to the same virtual space collaborate to compose a "virtual fact cluster", which shows all concepts that exist in composite facts related to the composite fact physically present at the terminal.

Preferably, composite facts are not augmented when two remote tokens or a remote token and a local token are displayed as touching due to an indirect association, because this would lead to very large clusters with a reduced semantic significance. For example, composite fact [A, B, C] and composite fact [A, D, E] do not imply composite fact [A, B, C, D, E]; otherwise, placing a token corresponding to concept B, C, D or E would always trigger the displaying of all 5 concepts, rendering the method less useful. Rather, placing a token corresponding to concept B or C will display only virtual remote token A and any other remote tokens involved in composite facts about A. This means that in the virtual space only composite facts occur that effectively exist as a whole on a single board. In other words, virtual fact clusters are just displaying query results, and are not to be confused with real composite facts. This system choice avoids "explosion" of the set of composite facts.

In an alternative scheme, combining composite facts that are touching only virtually to generate new composite facts is also allowed, but only to the first degree. Hence, for example, composite fact [A, B], composite fact [A, C] and composite fact [B, D] imply generated first-degree composite facts [A, B, C] and [A, B, D], but not [A, B, C, D], as the latter would involve concepts that are linked via two intermediate hops: B is linked to D only via A and C.

Optionally, the terminal may be adapted to display the concepts associated with the IDs of all terminals on which a token is physically placed (i.e., the names of the various boards that carry an equivalent token), both for physical and for virtual tokens. Such displaying may be performed as token-decoration add-on information, e.g. by means of a label on top of a token, or a cavity on the side or inside the token for displaying the info.

A feature of the communication scheme disclosed herein is that using a token associated with a concept that is also used as the name of a terminal implies a specific communication to that board. All virtual fact clusters including the concept that is used as the terminal's name are always displayed on the board. In fact, this operation is fully equivalent to putting a token associated with the concept of the terminal's name on a regular position (i.e., a position not designated for individualizing the terminal), at any terminal. Hence, assuming for example that terminals are named using person-designating concepts, a person A can bring a concept to the specific attention of a person B by adding a token with person B's name to the concept on person A's board. Incidentally, any terminal carrying a token corresponding to person A's name, will also be alerted of this.

Figure 3:
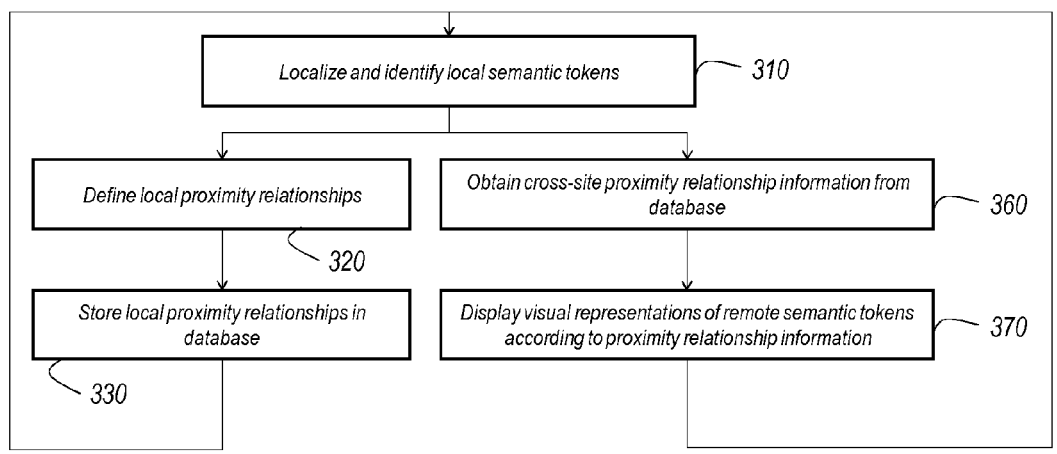
FIG. 3 presents a flowchart of a method according to an embodiment of the present invention.

Referring to FIG. 3, an embodiment of the method according to the present invention may be described as follows. In a first step 310 the terminal localizes and identifies any local tokens that are brought in proximity with the terminal 100 by using the detection means 120-129. Information from the detection means 120-129 is passed on to proximity logic 140 to define local proximity relationships in step 320. Any local proximity relationships so defined are forwarded to the storage means 200 via database update agent 150, in step 330. The facts and composite facts represented by the proximity relationships between the semantic tokens physically present at the terminal 100 are combined into virtual fact clusters that are displayed on terminal 100, and which are implied by the composite facts expressed by the concerned physical tokens at other terminals.

To adequately update the display of virtual tokens on display 130 of terminal 100, cross-site proximity relationship information is obtained via a query to storage means 200 in step 360. Such a query typically requests, for each given local semantic token, a list of semantic tokens present at other terminals in a proximity relationship with a token representing the same concept as the given local semantic token. The storage means 200 is able to respond to such a query, because it stores the necessary topological information about the tokens present at other terminals, for instance in the form of these tokens' coordinates, or their mutual proximity relationships. Depending on the format of the data obtained from the storage means 200, the database querying agent 160 may have to perform extra steps to arrive at the actual cross-site proximity relationships representing virtual fact clusters.

Having thus obtained the cross-site proximity relationship information, database querying agent 160 controls display 130 to adequately display visual representations of remote tokens according to that proximity relationship information in step 370. Although the steps of the method as illustrated in FIG. 3 are shown in a particular order, this is done for clarity purposes only, and does not imply any limitation to the method of the invention as claimed. In particular, it will be understood by those skilled in the art that it is advantageous to update and query the database of storage means 200 any time a token is physically added to or removed from terminal 100.

With reference to FIGS. 4-8, we will now describe an exemplary communication session between three exemplary users named Robin, Marian and Will. The number of users is chosen for clarity purposes only and is not intended to limit the claimed invention in any way.

Figure 4:
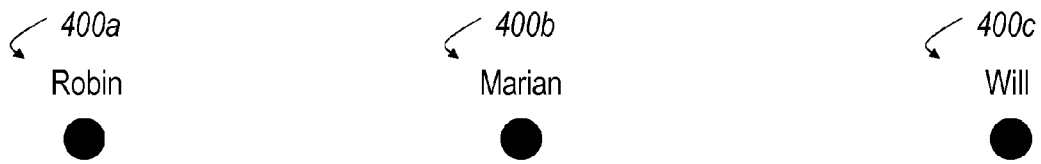
FIGS. 4-8 represent graphs of proximity relationships established in an exemplary communication session, using the system of the present invention.

FIG. 4 represents three very simple graphs, each consisting of a single node, representing a token. Graph 408 consists of a token associated with username Robin. This graph shall be understood as a conceptual representation of a terminal 100a in the designated naming area 120 of which a token with the visual sign 'Robin' has been placed. No other tokens are present at terminal 100a as illustrated in FIG. 4. Graph 400b shall in similar manner be understood to graphically represent the state of a terminal 100b which has been named by means of a token carrying the username Marian. Graph 400c shall in similar manner be understood to graphically represent the state of a terminal 100c which has been named by means of a token carrying the username Will.

Figure 5:
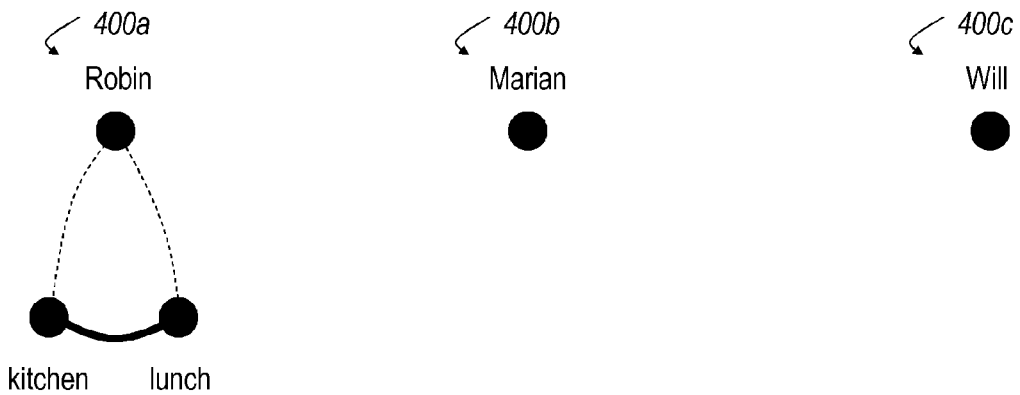

In FIG. 5, the same three graphs are represented describing the state of the cited terminals 100a, 100b, 100c, as it would be after placing two tokens labeled 'kitchen' and 'lunch', respectively, in adjacent positions of terminal 100a. The tokens labeled 'kitchen' and 'lunch' have two distinct identities that may be detected and distinguished by detection means 121-129 of terminal 100a, and which may be associated with their respective semantic concepts 'kitchen' and 'lunch', by means of an appropriate lookup table or database. By placing the tokens marked 'kitchen' and 'lunch' in adjacent positions at terminal 100a, user Robin has created a proximity relationship between the said tokens, which represents a composite fact linking the concept 'kitchen' to the concept 'lunch'. This proximity relationship and the implied composite fact are represented by the solid line joining the two nodes in graph 400a. The implicit proximity relationship between each of the tokens labeled 'kitchen' and 'lunch' and the token labeled 'Robin', is indicated in graph 400a by a dotted line. At this stage of the communication session, terminals 100b and 100c, the state of which is represented by graphs 400b and 400c respectively, are not aware of the information added to the system by user Robin.

Figure 6:
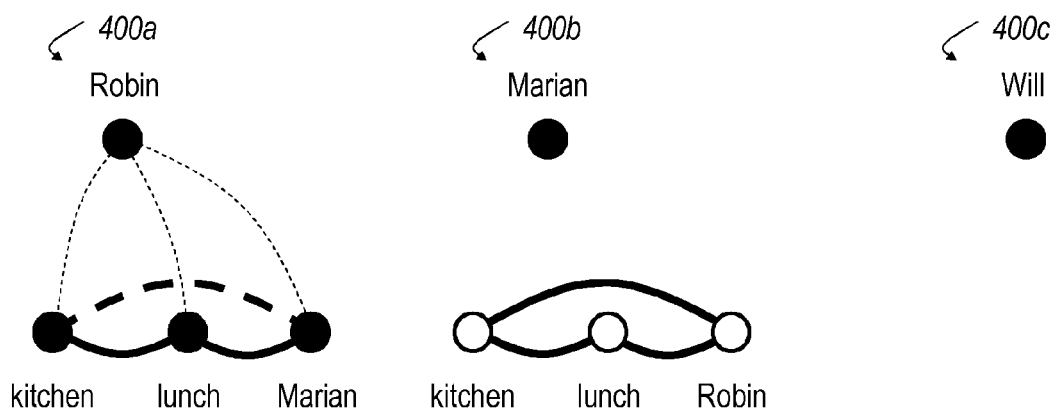

FIG. 6 illustrates the state of the three cited terminals 100a, 100b and 100c, after user Robin has added a token labeled 'Marian' to terminal 100a, in a position adjacent to the token marked 'lunch'. User Robin has now established direct communication with terminal 100b, which has been named by a token marked 'Marian'. This is accomplished by the establishment of a composite fact linking the concepts 'kitchen', 'lunch' and 'Marian'. The proximity relationship between the tokens marked 'kitchen' and 'lunch' on terminal 100a, is represented as before by a solid line. Likewise, the proximity relationship between the tokens marked 'lunch' and 'Marian' is represented by another solid line. Assuming that the system operates under a rule that imposes transitivity on physical proximity relationships, an implied proximity relationship exists between the tokens marked 'kitchen' and 'Marian', which relationship is presented in graph 400a by a dotted line. As before, the implied proximity relationships between the naming token marked 'Robin' and the various respective tokens placed on terminal 100a are indicated by dotted lines. The mutual proximity relationships between the tokens marked 'Robin', 'Marian', 'lunch' and 'kitchen', placed on terminal 100a, and the corresponding composite fact linking the concepts 'Robin', 'kitchen', 'lunch' and 'Marian' are visually represented on all terminals that physically carry a token corresponding to one of the involved concepts. In the situation of FIG. 6, the only other terminal that meets that condition is terminal 100b, represented by graph 400b, which carries a token marked 'Marian' in the designated naming position. As a result, the remaining concepts belonging to the concerned virtual fact cluster are displayed on terminal 100b under the form of virtual tokens marked 'kitchen', 'lunch', and 'Robin', respectively.

Figure 7:
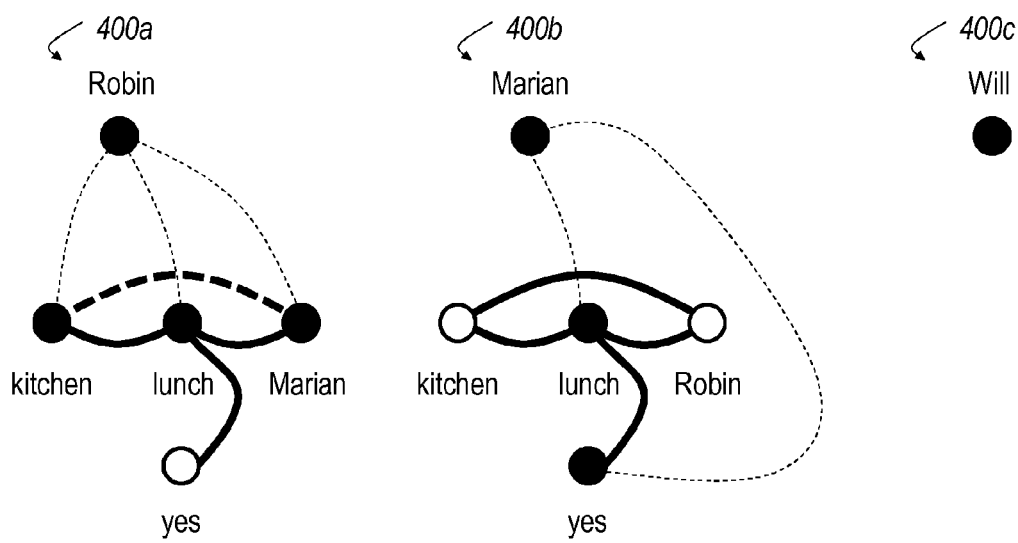

FIG. 7 represents the state of the cited terminals 100a, 100b and 100c, after user Marian has added tokens marked 'lunch' and 'yes' to terminal 100b. It should be noted that the token marked 'lunch' is placed in proximity to any of the tokens included in the virtual fact cluster that was on display, and that the token 'yes' is placed in proximity to the token 'lunch'. The resulting proximity relationships are indicated in the graph by means of lines connecting the various nodes. As a result of the mutual proximity between the physical tokens marked 'Marian', 'lunch' and 'yes', present at terminal 100b, and the virtual tokens marked 'kitchen' and 'Robin', displayed at terminal 100b, a virtual fact cluster is represented including the concepts 'Marian', 'kitchen', 'lunch', 'Robin' and 'yes'. This virtual fact cluster will be displayed at all terminals that physically carry a token associated with one of the concepts included in the virtual fact cluster. In the situation of FIG. 7, the only other terminal that meets that condition is terminal 100a, the state of which is represented by graph 400a, which shares the concepts 'lunch' and 'Marian' with the aforementioned virtual fact cluster. As a result, the concept 'yes' is now displayed at terminal 100a, to complete the representation of the virtual fact cluster shared by Robin and Marian.

Figure 8:
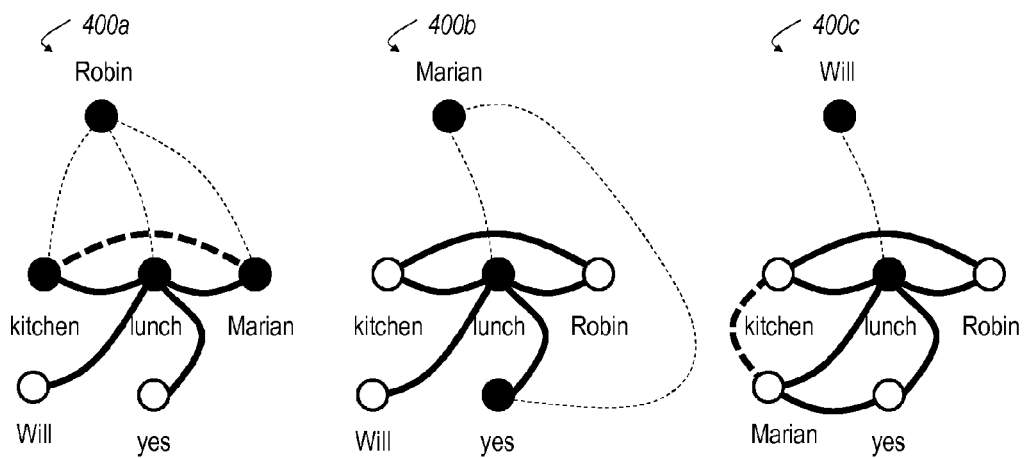

FIG. 8 represents the state of the cited terminals 100a, 100b and 100c, after user Will has placed a token marked 'lunch' at terminal 100c. Terminal 100c, the state of which is represented by graph 400c, now carries a token associated with a concept which is included in a pre-established virtual fact cluster. Hence, terminal 100c now meets the condition for displaying the aforementioned virtual fact cluster. As only the concept 'lunch' is physically represented by a token at terminal 100c, the remaining concepts 'kitchen', 'Marian', 'yes' and 'Robin' will appear as virtual tokens on the display of terminal 100c. However, the placement of a token marked 'lunch' on terminal 100c has also added a proximity relationship between said token and the token marked 'Will' used for naming terminal 100c. Hence, the virtual fact cluster mentioned before, is once more expanded with an additional concept, which concept will automatically be displayed at terminals 100a and 100b, as a visual representation of a token marked 'Will'.

The communication session described in association with FIGS. 4-8 may be interpreted as an invitation to lunch from Robin to Marian, which is subsequently accepted by Marian, and then seen but not acted on by Will. It shall be understood that the same communication mechanisms may be used to exchange more complex messages, depending on the nature of the tokens used, and the context agreed by the participants.

FIGS. 9-13 illustrate the same communication session as represented by FIGS. 4-8, according to the same series of steps, in a lay-out that resembles an exemplary embodiment of the terminals 100a, 100b and 100c, under the form of whiteboards designed to receive a number of magnetic cards. Each of the terminals 100a, 100b and 100c is shown with 35 token positions in a main active area and a designated naming position separated from the other positions. The reader will understand that the size and number of token positions is chosen for clarity purposes only and is not indented to limit the invention in any way.

Figure 9:
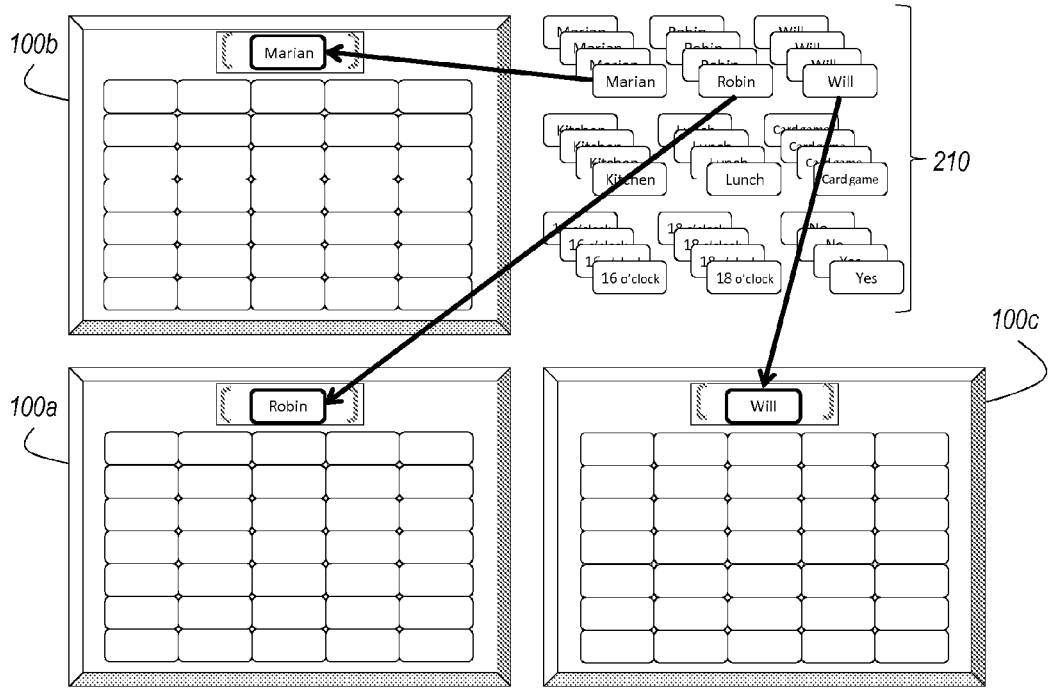
FIGS. 9-13 represent views of an exemplary implementation of the terminals according to the present invention, as used in the same exemplary communication session as represented in FIGS. 4-8.

FIG. 9 describes the state of the terminals 100a, 100b and 100c, when each of the terminals is equipped with a single physical token in the naming area.

Figure 10:
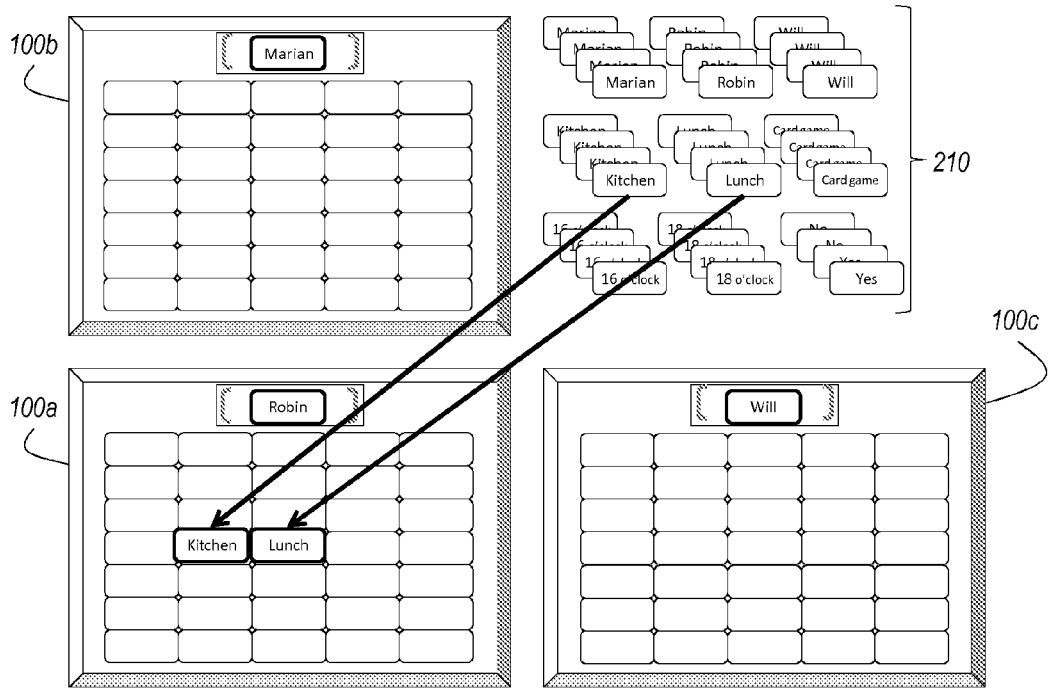

FIG. 10 illustrates the state of the cited terminals, when terminal 100a is equipped with two tokens marked 'kitchen' and 'lunch', respectively, placed in adjacent positions.

Figure 11:
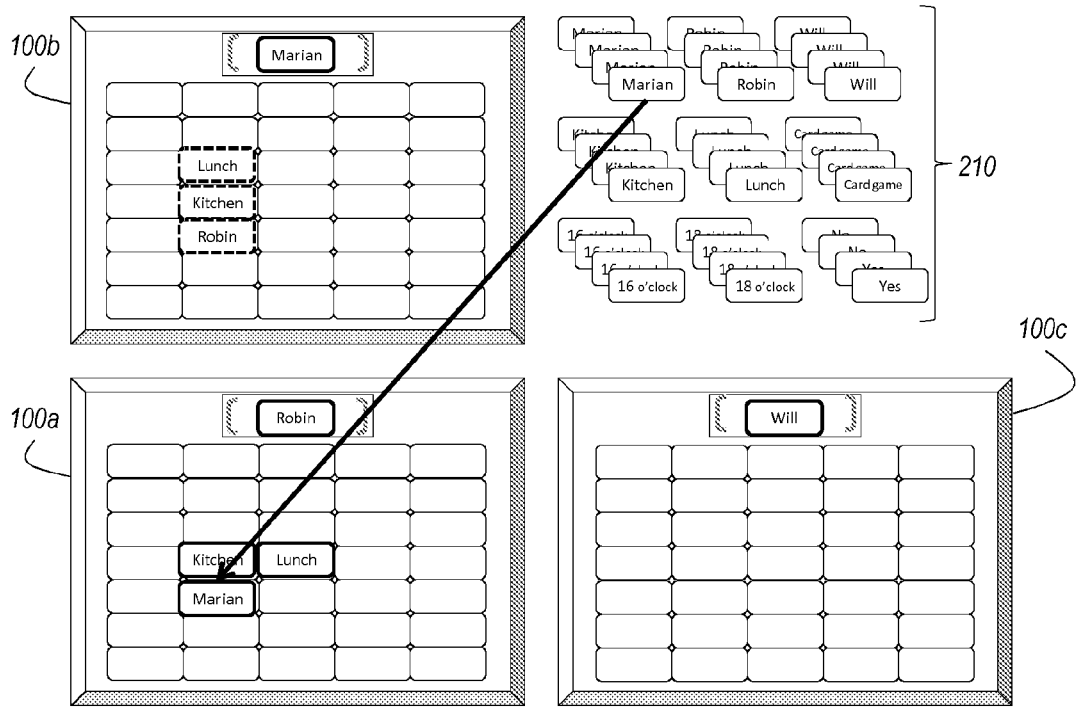

FIG. 11 illustrates the state of the cited terminals 100a, 100b and 100c, when an additional token marked 'Marian' is added to terminal 100a in a position adjacent to the previously placed token marked 'kitchen'. As a result of this addition, terminal 100b labeled 'Marian' will now display a virtual fact cluster including the concepts 'lunch', 'kitchen' and 'Robin'.

Figure 12:
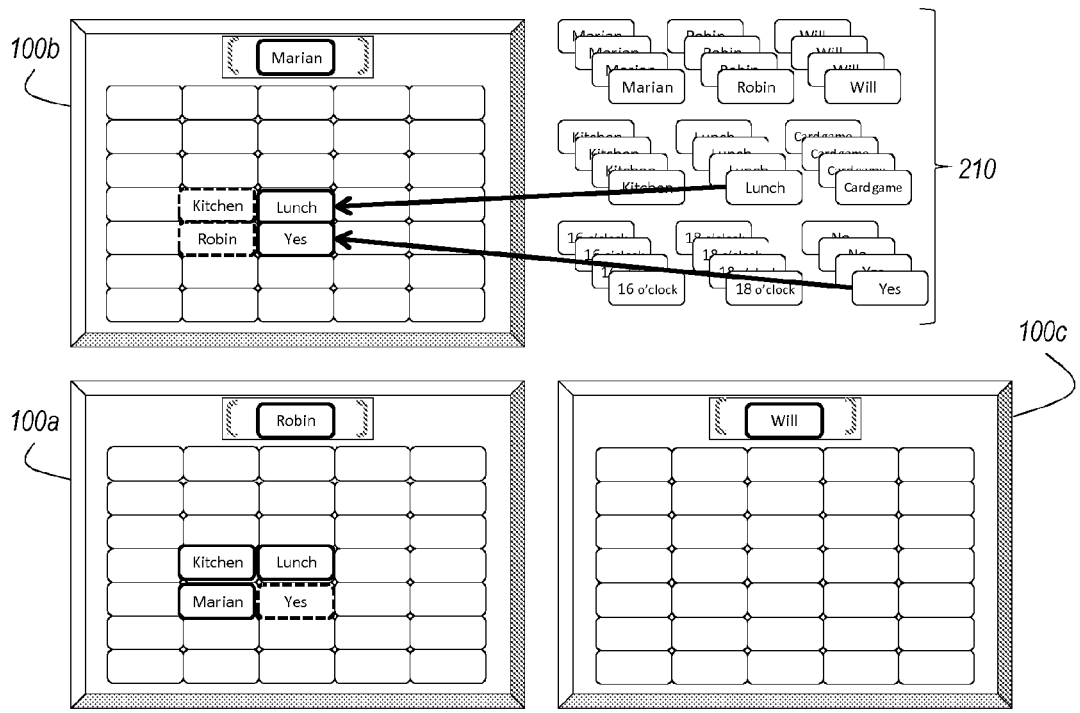

FIG. 12 illustrates the state of the cited terminals 100a, 100b and 100c, after the addition of tokens marked 'lunch' and 'yes' on terminal 100b, in positions adjacent to the virtual tokens 'kitchen' and 'Robin'. As a result of this addition, terminal 100a will now display a virtual token marked 'yes', as a new member of the previously created virtual fact cluster.

Note that FIG. 12 provides an illustration of an additional, generally applicable option of the present invention. When a physical token is placed in meaningful proximity of a displayed virtual fact cluster including a virtual representation of the same concept as the one represented by the physical token, the resulting composite fact is added to the cluster and the displayed version of the concept is removed, as it has become redundant by the addition of the physical token. This mechanism is assumed to have taken place in FIG. 12, which is why the 'lunch' token displayed in FIG. 11 is no longer displayed in FIG. 12.

Figure 13:
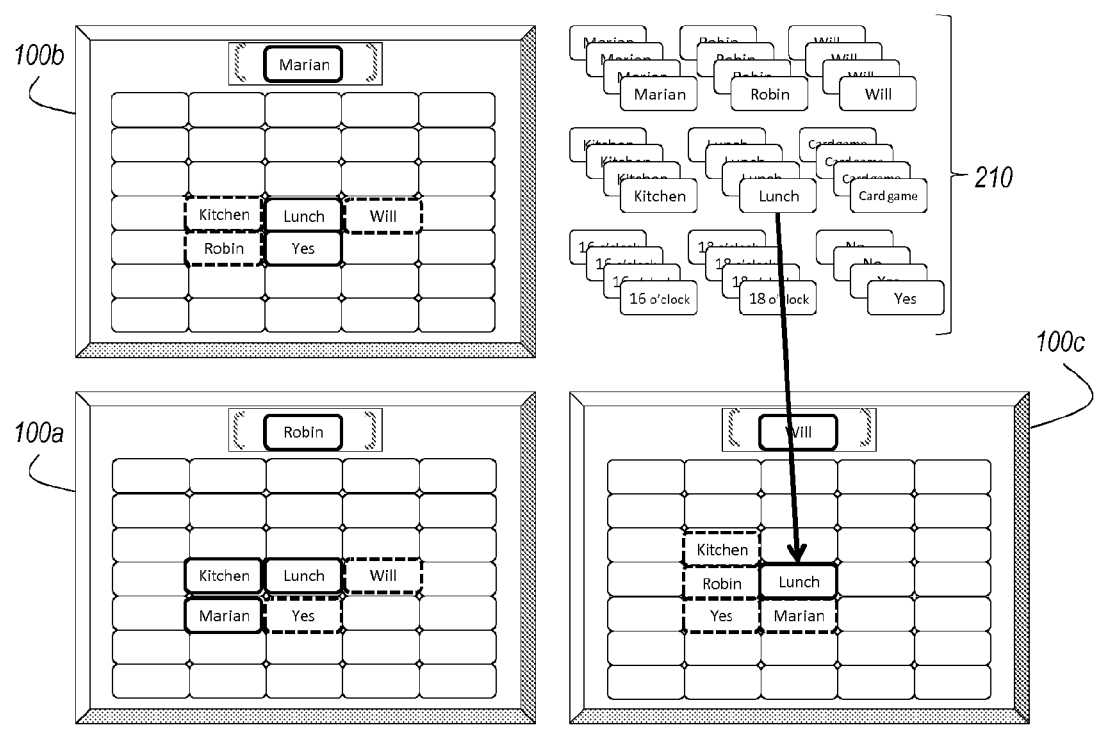

FIG. 13 illustrates the state of the cited terminals 100a, 100b and 100c, after adding a signal token marked 'lunch' at an arbitrary position of terminal 100c, named 'Will'. The result of this addition is that the various concepts factually related to the concept 'lunch' will be displayed under the form of virtual tokens on terminal 100c, and that the concept 'Will' will be displayed under the form of an additional virtual token on terminals 100a and 100b, as a new member of the pre-existing virtual fact cluster associated with the concepts 'lunch', 'kitchen', 'Robin', 'Marian' and 'yes'.

In general, it is possible to optimize the way in which virtual tokens are displayed at the terminal. One such optimization is to detect when an additional physical token is placed in a position where a virtual token is being displayed. In that case, it can be advantageous to reorder the displaying of the virtual tokens of the concerned virtual fact cluster. Alternatively, it may be advantageous to consider this action as an intent to replace an existing proximity relationship with a new one.

In embodiments of the invention, the order in which the tokens are added, the details of their respective positions, or the full graph topology can be used to derive additional meaning or knowledge about the concerned composite facts and/or virtual fact clusters.

In embodiments of the invention, the rules that are used to derive virtual fact clusters are made more complex. In particular, it may be desired to distinguish direct connections within composite facts to derive second order relationships in clusters, which may for example be represented graphically by varying the distance at which concepts are displayed. Hence, it becomes possible for observers of the virtual fact cluster to tell whether any given pair of concepts in the virtual fact cluster is linked by a direct "touching" relationship or by a composed relationship.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor", "logic", "agent", or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random dom access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A terminal for exchanging messages via tokens brought in proximity to the terminal, the terminal comprising:
   at least one communication processor to exchange token relationship information with storage media;
   at least one detection processor for substantially localizing and identifying local semantic tokens brought in proximity to the terminal;
   a display for displaying a visual representation of remote semantic tokens;
   proximity logic configured to assert a local proximity relationship between a first one of the local semantic tokens and a reference location if the first one of the local semantic tokens and the reference location are localized at a distance below a predetermined first proximity radius, the reference location being a second one of the local semantic tokens or a fixed point on the terminal;
   a database update agent, operatively coupled to the proximity logic, for storing asserted local proximity relationships in the storage media; and
   a database querying agent for obtaining cross-site proximity relationship information pertaining to the local semantic tokens from the storage media, the cross-site proximity relationship information comprising an identification of remote semantic tokens present at another terminal in a proximity relationship with semantic tokens equivalent to respective ones of the local semantic tokens,
      wherein the display is configured to display visual representations of the remote semantic tokens in proximity to respective ones of the local semantic tokens in accordance with the cross-site proximity relationship information.

2. The terminal according to claim 1, further comprising a terminal identification zone, wherein the at least one detection processor is configured to identify an identification token brought in proximity to the identification zone, and wherein the proximity logic is further configured to assert a local proximity relationship between the identification token and each of the local semantic tokens.

3. The terminal according to claim 1, further comprising a substantially board-shaped housing, wherein the display extends substantially over one side of the board-shaped housing.

4. The terminal according to claim 1, further adapted to releasably hold the local semantic tokens in place.

5. The terminal according to claim 4, further adapted to hold semantic tokens by magnetic force.

6. A communication system comprising;
a plurality of terminals according to claim 1;
a plurality of tokens at each one of the plurality of terminals; and storage media for storing the proximity relationships between the tokens.

7. The communication system according to claim 6, wherein each token of the plurality of tokens comprises:
a visual marking; and
an electronic identifier.

8. The communication system according to claim 7, wherein the plurality of tokens comprises a plurality of classes of tokens with a substantially identical visual marking.

9. The communication system according to claim 8, wherein the proximity logic of the terminals is further configured to assert a local class proximity relationship between a first one of the classes and a reference location if a first one of the local semantic tokens belonging to the first one of the classes and the reference point are localized at a distance below a predetermined first proximity radius, the reference location being a second one of the local semantic tokens belonging to a second one of the classes or a fixed point on the terminal.

10. The communication system according to claim 7, wherein the electronic identifier comprises an RFID tag.

11. The communication system according to claim 6, wherein the token further comprises terminal attachment mechanism for attaching the token to one of the plurality of terminals.

12. The communication system according to claim 11, wherein the terminal attachment mechanism comprises a magnetic element.

13. A token for use in the communication system of claim 6.

14. A method for exchanging via tokens brought in proximity to a terminal, implemented by a programmable device comprising a non-transitory computer-readable storage medium in which a program is saved, the program comprising instructions which, when executed, prompt the terminal to:
substantially localize and identifying local semantic tokens brought in proximity to the terminal;
assert a local proximity relationship between a first one of the local semantic tokens and a reference location if the first one of the local semantic tokens and the reference location are localized at a distance below a predetermined first proximity radius, the reference location being a second one of the local semantic tokens or a fixed point on the terminal;
store asserted local proximity relationships in a storage media;
obtain cross-site proximity relationship information pertaining to the local semantic tokens from the storage media, the cross-site proximity relationship information comprising an identification of remote semantic tokens present at another terminal in a proximity relationship with semantic tokens equivalent to respective ones of the local semantic tokens;
display visual representations of the remote semantic tokens in proximity to the respective ones of the local semantic tokens in accordance with the cross-site proximity relationship information.

15. The method according to claim 14, wherein the terminal is a designated area on a computer display, and wherein the semantic tokens are icons on the computer display, the tokens being brought in proximity to the terminal by dragging and dropping the icons into the designated area.

\* \* \* \* \*